Oct. 26, 1937.  G. C. WEIS  2,097,006
TRAILER DRAWBAR ATTACHMENT
Filed March 25, 1937
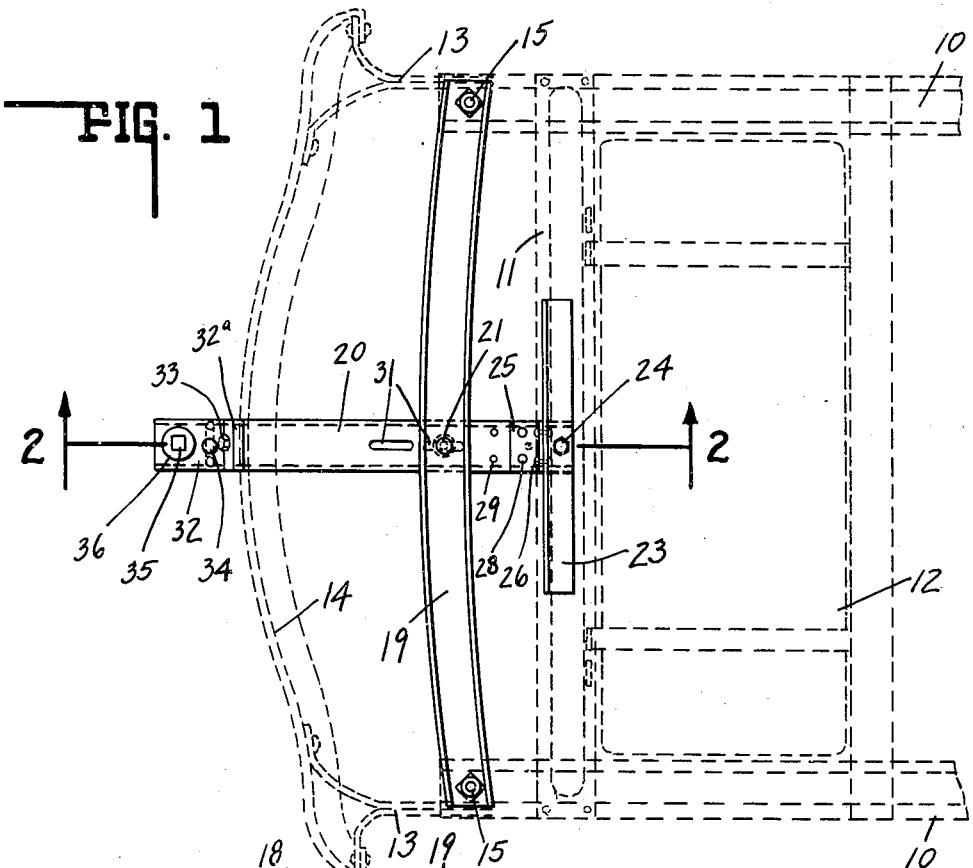
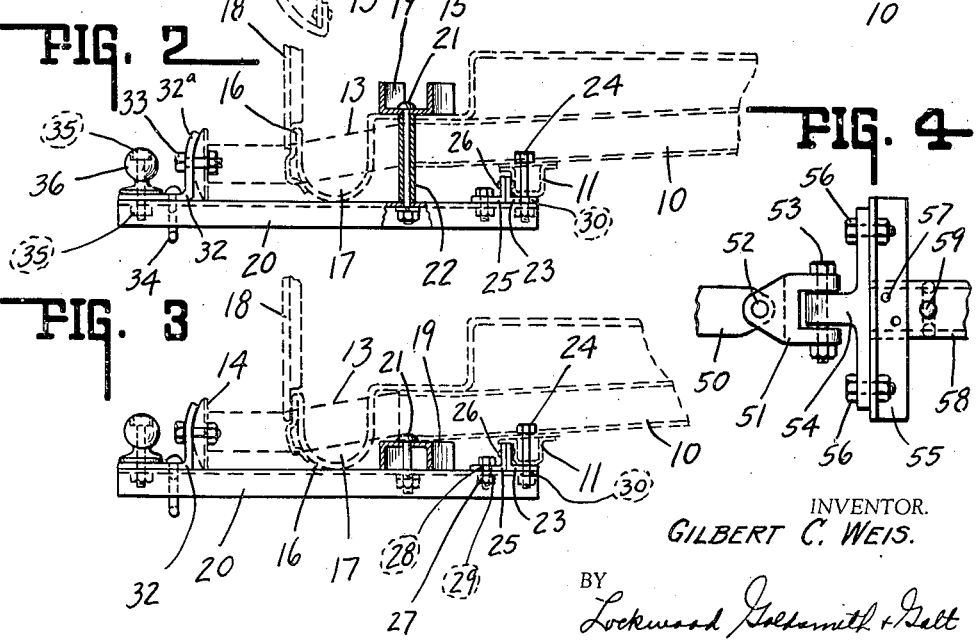
INVENTOR.
GILBERT C. WEIS.
BY
Lockwood Goldsmith & Galt
ATTORNEYS.

Patented Oct. 26, 1937

2,097,006

UNITED STATES PATENT OFFICE 2,097,006

TRAILER DRAWBAR ATTACHMENT

Gilbert C. Weis, Indianapolis, Ind.

Application March 25, 1937, Serial No. 132,943

15 Claims. (Cl. 280—33.44)

This invention relates to an attachment to a vehicle frame for towing a trailer or the like.

The chief object of the present invention is to provide an attachment which is readily applicable to standard vehicle frame structures with a minimum of changes and additions to the latter. The attachment is also arranged such that interconnections between parts thereof are of a multiple position character providing additional accommodation or adjustment for the spacing between the vehicle and the trailer.

The chief feature of the invention, in addition to the accomplishment of the foregoing object, is that an attachment of the general character set forth provides a relatively rigid towing connection so that side play, due to lateral whipping of the trailer, is minimized in its transmission to the frame and the anchorage of the drawbar to the frame is of such character that distortion between portions of the frame is substantially eliminated.

Another feature of the invention consists in connecting the towing or drawbar to the frame at a plurality of points,—not less than two or more,—and these being spaced apart a considerable distance.

Other objects and features of the invention will be readily understood from the accompanying drawing and the following description and claims:

In the drawing, Fig. 1 is a top plan view of the attachment, the broken lines indicating concealed parts thereof and the rear portion of a supporting vehicle frame. Fig. 2 is a longitudinal sectional view of the attachment and the vehicle frame, the latter being shown by broken lines and the section being taken approximately along line 2—2 of Fig. 1 and in the direction of the arrows. Fig. 3 is a view similar to Fig. 2 and is of a modified form of the invention, the modification consisting in the inversion of one of the cross members and its positioning immediately adjacent the drawbar, as distinguished from the superposed spaced position previously illustrated. Fig. 4 is a top plan view of the rear portion of a further modified form of the invention.

In the drawing, 10 indicates two arm portions of the chassis frame including a double thickness cross member 11 constituting a support for the fuel tank 12. Extending rearwardly of the frame are arms 13 supporting the rear bumper 14. Body bolts 15 secure the body 16 to the frame. The body 16 includes the tool trough portion 17 and the lid 18 forms a cooperating closure for the trunk or storage compartment of the body. The foregoing constitutes standard construction of many known makes of passenger cars.

The invention proper, the trailer hitch, is non-interferingly associated with these parts and includes an arched or arcuately formed channel member 19 with its webs directed upwardly in Figs. 1 and 2 and downwardly in Fig. 3. The radius of curvature is approximately 14'—8''. Opposite ends are secured by the body bolts 15 to the frame arms 10. A drawbar 20 is channel-shaped in cross section and is secured in spaced relation to the arcuate brace and support member 19 by means of the medianly positioned bolt and nut structure 21 and spanning sleeve 22.

The double thickness cross member 11 intermediate its ends,—see Figs. 2 and 3,—is channel shaped in cross section and an angle iron reinforcing member 23 is medianly associated therewith by the bolt and nut structure 24. An angle plate 25 is secured to the angle iron 23 by rivets 26. Bolts and nuts 27 extend through openings 28 in the plate and registering holes 29 in drawbar 20. The bolt 24 also extends through drawbar 20 as at 30. Two longitudinal spaced openings 30 and two similarly spaced pairs of openings 29 are provided for accommodation spacings. The drawbar 20 includes a pair of elongated longitudinally aligned slots 31 similarly spaced for selective reception of bolt 21. The drawbar 20 at its rearward end supports an angle plate 32, the upper portion 32a conforming to bumper curvature and being secured thereto by the bolt and nut structure 33. Depending from the drawbar is an eye anchor member 34 for anchoring a safety chain between the vehicle and trailer. A bolt and nut structure 35 not only rigidly secures angle plate 32 and the end of the drawbar 20 together but secures thereto the ball portion 36 of a ball and socket connection for swivably securing a trailer to the vehicle. The eye anchor member 34 also rigidly secures together the angle plate 32 and the drawbar 20.

The ball 36 and bolt 35 are standard equipment,—that is, usually come with the trailer.

The hitch shown in Fig. 3 is almost identical to that shown in Figs. 1 and 2 except for the inversion of the channel member 19 and its anchorage to the underface of the frame instead of in its prior superposed mounting.

In Fig. 4, a modified form of connection is illustrated. Herein, 50 indicates the trailer tongue, 51 a link horizontally pivoted at 52 thereto at one end and vertically pivoted at 53 at its opposite end to the vehicle anchored member 54. An angle plate 55 is bolted to member 54 at 56. Plate 55 is inserted or otherwise secured at 57 to drawbar 58 which also supports the eye anchor member 59.

Drawbar 58 is the same as, or similar to, drawbar 20. The angle member connection between the drawbar 20 and bumper 14 may also be included if, as and when desired. The foregoing constitutes the universal joint form of the invention as distinguished from the ball and socket joint form illustrated in Figs. 1 to 3 inclusive.

While the invention has been described in great detail in the foregoing specification, the same is to be considered as illustrative and not restrictive in character. The several modifications herein illustrated and described, as well as others which will readily suggest themselves to persons skilled in the art to which this invention applies, are considered to be well within the broad scope of the invention, reference being had to the appended claims.

The invention claimed is:

1. A trailer towing attachment for a vehicle frame, having a pair of frame arms and a cross member near the rear end thereof and a body bolted to the arms, the attachment including an arcuately formed cross member secured at opposite ends to the frame arms by body bolts, an elongated reinforcement secured to the first-mentioned cross member, a drawbar secured intermediate its ends to the second-mentioned cross member and medianly thereof and to the reinforcement, and a pivot forming connecting member secured to the other end of the drawbar.

2. A device as defined by claim 1 characterized by the frame including a bumper secured to the frame arms, and by the addition of the rigid connection between the bumper and the drawbar, the latter projecting rearwardly of the bumper.

3. A device as defined by claim 1 characterized by the second-mentioned cross member being channel-shaped in cross section.

4. A device as defined by claim 1 characterized by the second-mentioned cross member being channel-shaped in cross section and with the webs thereof directed upwardly and by the addition of a spacing member between the drawbar and the channel cross member and operatively associated with the connection therebetween.

5. A device as defined by claim 1 characterized by the connections between the drawbar and the reinforcement and the second-mentioned cross member, each being of detachable character including bolt means, the adjacent connected members being apertured, the aperturing in the drawbar for each connection being multiplied, the spacing between such multiplications being substantially the same, the initial spacing being equal to the effective linear distance between the second-mentioned cross member and the reinforcement at the drawbar connections thereto.

6. A trailer towing attachment for a vehicle frame having a pair of frame arms and a cross member near the rear end thereof and a body bolted to the arms, the attachment including an arcuately formed cross member secured at opposite ends to the frame arms by body bolts, a drawbar secured intermediate its ends to the second-mentioned cross member and medianly thereof and to the first-mentioned cross member, and a pivot forming connecting member secured to the other end of the drawbar.

7. A device as defined by claim 6 characterized by the frame including a bumper secured to the frame arms, and by the addition of the rigid connection between the bumper and the drawbar, the latter projecting rearwardly of the bumper.

8. A device as defined by claim 6 characterized by the second-mentioned cross member being channel-shaped in cross section.

9. A device as defined by claim 6 characterized by the second-mentioned cross member being channel-shaped in cross section and with the webs thereof directed upwardly and by the addition of a spacing member between the drawbar and the channel cross member and operatively associated with the connection therebetween.

10. A device as defined by claim 6 characterized by the connections between the drawbar and the first-mentioned cross member and the second-mentioned cross member, each being of detachable character including bolt means, the adjacent connected members being apertured, the aperturing on the drawbar for each connection being multiplied, the spacing between such multiplications being substantially the same, the initial spacing being equal to the effective linear distance between the cross members at the drawbar connections thereto.

11. A trailer towing attachment for a vehicle frame having a pair of frame arms and a cross member and a body bolted to the frame, the attachment including an arcuately formed cross member secured at opposite ends to the arms by body bolts, an elongated reinforcement secured to the first-mentioned cross member, a drawbar secured intermediate its ends to the second-mentioned cross member and medianly thereof and to the reinforcement and the first-mentioned cross member, adjacent one end, and a pivot forming connecting member secured to the other end of the drawbar.

12. A device as defined by claim 11 characterized by the frame including a bumper secured to the frame arms, and by the addition of the rigid connection between the bumper and the drawbar, the latter projecting rearwardly of the bumper.

13. A device as defined by claim 11 characterized by the second-mentioned cross member being channel-shaped in cross section.

14. A device as defined by claim 11 characterized by the second-mentioned cross member being channel-shaped in cross section and with the webs thereof directed upwardly and by the addition of a spacing member between the drawbar and the channel cross member and operatively associated with the connection therebetween.

15. A device as defined by claim 11 characterized by the connections between the drawbar and the reinforcement and the cross members, each being of detachable character including bolt means, the adjacent connected members being apertured, the aperturing in the drawbar for each connection being multiplied, the spacing between each group of apertures being the same as that between another group of apertures.

GILBERT C. WEIS.